July 30, 1940.  O. J. BRATZ  2,209,673
SPHERICAL CABLE FITTING AND METHOD OF APPLYING SAME
Filed Nov. 15, 1937
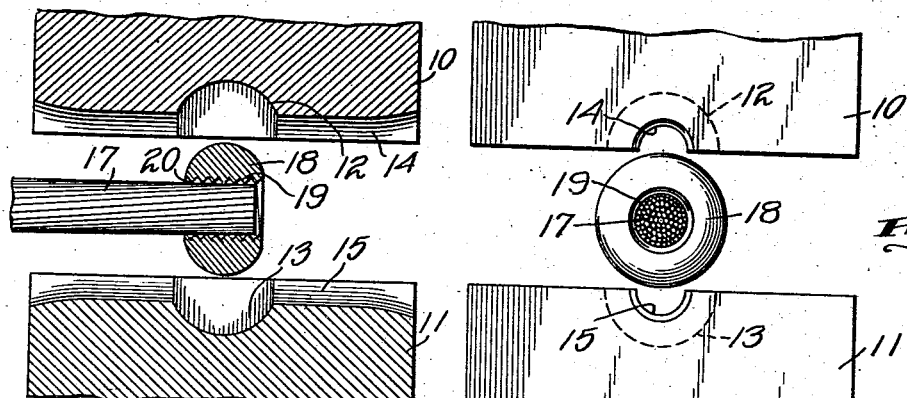
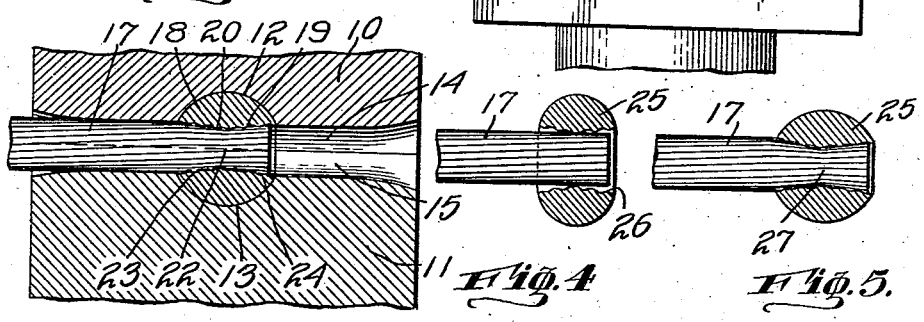
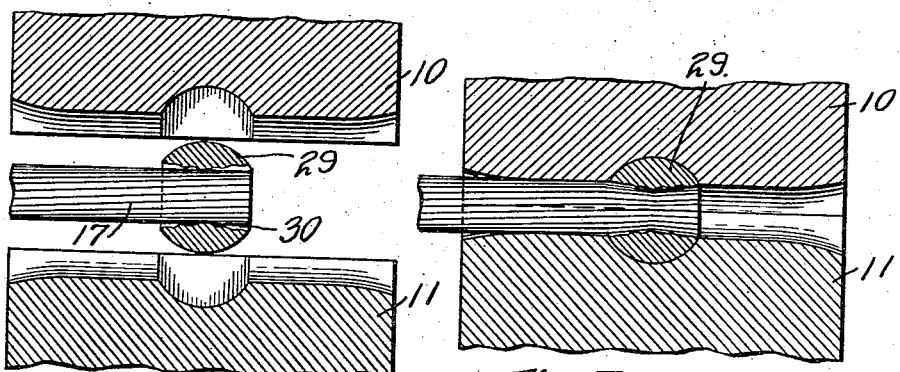
INVENTOR
OTTO J. BRATZ
BY Frederick P. Duncan
ATTORNEY Patented July 30, 1940

2,209,673

UNITED STATES PATENT OFFICE 2,209,673

SPHERICAL CABLE FITTING AND METHOD OF APPLYING SAME

Otto J. Bratz, Adrian, Mich., assignor to American Chain & Cable Company, Inc., New York, N. Y., a corporation of New York Application November 15, 1937, Serial No. 174,559

15 Claims. (Cl. 29—148)

This invention relates to stranded wire structures of the type including a plurality of wires laid together in helical relation to form what is commonly known as a strand and is applicable to wire ropes formed from such strands and to cables formed from a plurality of wire ropes and has for an object the provision of an improved end fitting for, and the method for applying the same to, such stranded wire structures which hereinafter will be referred to by the term "cable."

One object of the invention relates to a method for forming and/or securing a relatively small end fitting to a cable, such for example as is used for operating automobile brakes.

Another object of the invention is to provide a method for forming a truly spherical end fitting as the end fitting is secured to the end of a cable.

Another object of the invention is to provide a method for securely fastening a spherical end fitting onto a cable and for maintaining the true spherical shape of said fitting during the operation of attaching the same to the cable.

Another object of the invention is the method for forming and/or securing a spherical end fitting to the cable which results in constricting the cable to the greatest extent at the center of the fitting and to less extents from the center to the ends of the fitting.

Other objects of the invention will appear from the following description taken in connection with the drawing, in which:

Fig. 1 shows a pair of semi-spherical dies and an end-fitting of the form of an oblate spheroid in longitudinal section, and the end of a cable in said end fitting;

Fig. 2 shows a right end view of the dies, fitting and cable shown in Fig. 1;

Fig. 3 shows the final spherical form of the end fitting of Fig. 1 secured to a cable in accordance with my method;

Fig. 4 shows in section an end fitting of the same initial shape as that shown in Fig. 1 provided with a double bell-mouthed cable receiving bore;

Fig. 5 shows in section the end fitting of Fig. 4 secured to the cable in accordance with my method;

Fig. 6 shows in section an end fitting of initial spherical form having a double bell-mouthed bore and a pair of semi-spherical dies used in securing this end fitting to a cable; and Fig. 7 shows the end fitting of Fig. 6 secured to a cable in accordance with my method.

First referring to Figs. 1, 2 and 3 to describe my method of forming and securing an end fitting to a cable, Fig. 1 shows a pair of dies 10 and 11 which are provided with semi-spherical cavities 12 and 13 and with cable receiving semi-cylindrical grooves 14 and 15 respectively. The end fitting which is to be secured to the cable 17 is shown at 18, Figs. 1 and 2. This end fitting in its initial form is substantially an oblate spheroid and is provided with a bore 19 extending through its shortest diameter, which bore is substantially of the same diameter as the cable to which the end fitting is to be secured. The bore may be threaded or corrugated as indicated at 20. As shown in Fig. 1 the short diameter of the end fitting in its initial form is shorter than the diameter of the cavities in the dies and its larger diameter as shown in Fig. 2 is larger than the diameter of the cavities in the dies.

The dies 10 and 11 may be reciprocated by any suitable means to impact the end fitting 18 and the cable may be rotated during such impactment by any suitable means. During the operation of the dies, the oblate spheroid is brought down to the spherical shape shown in Fig. 3 except the portion thereof which is occupied by the bore in the ends of the end fitting. During the die action the die pressure on the cable is maximum adjacent the plane through the center of the end fitting and normal to the cable. As the initial shape of the end fitting is not spherical, in order to swage this end fitting to a spherical shape it becomes necessary for the metal to flow toward the axis of the cable.

Under the action of the dies the metal is forced toward the center of the fitting and also spreads out along the bottom of the cavities of the dies, and each successive blow causes the metal to gradually flow up the sides of the cavity and down into the cable, outward flow along the cable being prevented by the shape of the die which causes the metal to be forced between the wires of the cable and to decrease the metallic area of the cable at the center of the sphere as illustrated in Fig. 3. In the final form shown in Fig. 3, the cable is tightly compacted at the point 22 and less tightly toward each end of the end fitting. The bell-mouth 23 at the tension end of the cable prevents the cable from being cut by the end fitting and the bell-mouth 24 at the other end of the cable cooperates with the knob in the cable to hold the cable in the end fitting.

In Fig. 4 I have shown an end fitting 25 of the same general outside contour as that shown in Fig. 1 and I have provided the end fitting with a bore 26 of general hour-glass shape, the wall of the bore being preferably corrugated. The hourglass shape of the bore causes the end fitting when swaged into its final spherical form shown in Fig. 5 to accentuate constriction of the cable at the point 27.

In Fig. 6 I have shown an end fitting 29 which is initially spherical and is provided with an hourglass shaped bore 30. When the dies are operated the outer contour of the end fitting 29 will be maintained and the metal will be caused to flow to produce the connection shown in Fig. 7 thereby securely compacting the cable at the center of the fitting, providing a connection between the fitting and the cable substantially the same as that shown in Figs. 3 and 5.

In accordance with the method that I have disclosed herein the end fitting may be maintained in or swaged into truly spherical form and securely fastened to the end of the cable, the method being especially applicable to small cables and small end fittings. The method is also applicable to other forms of fittings, as for example, cylindrical fittings.

While I have disclosed the method of carrying out my invention in connection with the several initial forms of end-fittings disclosed, it is to be understood that my method is not to be limited to these forms by the illustration and description of said forms and I reserve the right to use any other initial form to produce other final forms by which the principle of the invention may be carried out as set forth in the specification and claims forming a part thereof.

I claim:

1. The method of securing a fitting to a cable which consists in applying pressure initially at the center on the fitting and then applying pressure on the entire surface of the fitting and restraining the flow of metal endwise exteriorly of said fitting along the axis of said cable.

2. The method of securing a fitting to a cable which consists in applying greater pressure at the center of the fitting to constrict the cable, and in restraining the flow of metal endwise exteriorly of said fitting along the axis of the cable.

3. The method of forming and securing a spherical fitting consisting of a single piece of metal to a cable which consists in swaging said fitting into spherical form on to the end of cable and in restraining the flow of metal of the fitting along the cable away from the fitting during the swaging operation.

4. The method of securing a spherical fitting consisting of a single piece of metal to a cable which consists in swaging the fitting to reduce its diameter and compress the cable and in restraining the flow of the metal along the cable away from the center of the fitting during the swaging operation.

5. The method of securing a fitting to a cable which consists in impacting said fitting and in directing the flow of the metal toward the center of said fitting to cause greatest constriction of the cable at the center of said fitting.

6. The method of forming and securing a fitting to a cable, comprising impacting and shaping the fitting into the form desired and in directing the flow of metal towards the center of the fitting to produce the greatest degree of constriction at the center of the fitting.

7. The method of securing a spherical fitting consisting of a single piece of metal to a cable, which consists in swaging the fitting to constrict the cable to a greater degree centrally of the fitting and progressively less toward the ends of the fitting.

8. In a method of forming and securing a spherical fitting consisting of a single piece of metal to a cable which consists in placing the end of the cable in a cylindrical bore through the short diameter of an oblate spheroid and in swaging said spheroid into a sphere by means of spherical dies.

9. The method of forming and securing a fitting to a cable, the final form of which has a circular contour with respect to the cable as the axis and an arcuate contour transversely in axial planes of the cable, comprising swaging said fitting between a pair of dies of corresponding circular contour of smaller radius and of arcuate contour transversely on longer radii than said fitting.

10. The method of connecting a spherical fitting having a diametral bore bell-mounted at each end to a cable, which consists in swaging said fitting on to a cable placed in said bore to produce a constricted section in said cable at the center of said fitting, and less constricted sections outwardly therefrom toward each end of said bore.

11. The method of securing a spherical fitting having a bell-mouthed diametral bore to a cable, which consists in swaging said fitting into a smaller sphere on to said cable.

12. The method of securing a fitting having a bell-mouthed diametral bore to a cable which consists in swaging said fitting to smaller dimensions to constrict said cable most centrally of said fitting and progressively less toward the ends of the fitting.

13. The combination of a cable and a fitting consisting of a single piece of metal, said fitting being impacted upon said cable throughout the entire length of said fitting and constricting said cable to the greatest degree at the center of said fitting and to a progressively less extent from the center to the ends of the fitting leaving the cable at both ends of the fitting substantially uncompressed.

14. The combination of a cable and a spherical end fitting consisting of a single piece of metal, impacted upon said cable throughout the entire length of said end fitting and constricting said cable to a great degree at the center of the fitting and progressively less toward the tension end of the fitting leaving the cable at this end of the fitting substantially uncompressed.

15. The combination of a cable and a spherical end fitting consisting of a single piece of metal impacted upon said cable throughout the entire length of said end fitting, to a great degree at the center of the fitting and progressively less toward the end of the cable leaving the cable at this end of the fitting substantially uncompressed.

OTTO J. BRATZ.

CERTIFICATE OF CORRECTION.

Patent No. 2,209,673.   July 30, 1940.

OTTO J. BRATZ.

It is hereby certified that error appears in the printed specification of the above numbered patent requiring correction as follows: Page 2, first column, line 49, claim 3, strike out the words "end of"; and that the said Letters Patent should be read with this correction therein that the same may conform to the record of the case in the Patent Office.

Signed and sealed this 15th day of October, A. D. 1940.

Henry Van Arsdale,
Acting Commissioner of Patents.

(Seal)